US012477084B2

(12) United States Patent
Michael et al.

(10) Patent No.: US 12,477,084 B2
(45) Date of Patent: Nov. 18, 2025

(54) SYSTEM AND METHOD FOR AUTOMATIC DETECTION OF MARITIME BLACKOUT EVENTS

(71) Applicant: ShipIn Systems Inc., Newton, MA (US)

(72) Inventors: David J. Michael, Waban, MA (US); Osher Perry, Newton, MA (US)

(73) Assignee: ShipIn Systems Inc., Newton, MA (US)

( * ) Notice: Subject to any disclaimer, the term of this patent is extended or adjusted under 35 U.S.C. 154(b) by 0 days.

(21) Appl. No.: 19/190,467

(22) Filed: Apr. 25, 2025

(65) Prior Publication Data

US 2025/0337864 A1 Oct. 30, 2025

Related U.S. Application Data

(60) Provisional application No. 63/639,258, filed on Apr. 26, 2024.

(51) Int. Cl.
   *H04N 7/18* (2006.01)
   *G06V 10/75* (2022.01)
   *G06V 20/52* (2022.01)

(52) U.S. Cl.
   CPC ........... *H04N 7/183* (2013.01); *G06V 10/758* (2022.01); *G06V 20/52* (2022.01)

(58) Field of Classification Search
   CPC ....... H04N 7/183; G06V 20/52; G06V 10/758
   (Continued)

(56) References Cited

U.S. PATENT DOCUMENTS

| 6,903,676 B1 * | 6/2005 | Frady .................... G01S 13/723 |
| | | 342/52 |
| 9,106,810 B1 | 8/2015 | Hadsall, Sr. |

(Continued)

FOREIGN PATENT DOCUMENTS

| CN | 109819393 A | 5/2019 |
| CN | 110363463 A | 10/2019 |

(Continued)

OTHER PUBLICATIONS

Bloomfield, Nathaniel J., et al. "Automating the assessment of biofouling in images using expert agreement as a gold standard." Scientific Reports 11.1 (2021): 2739 [online], [retrieved on May 18, 2023]. Retrieved from the Internet <https://arxiv.org/pdf/ 2008.09289.pdf> (Year: 2021) 12 pages.

(Continued)

*Primary Examiner* — Kenny A Cese
(74) *Attorney, Agent, or Firm* — Loginov & Associates, PLLC; William A. Loginov (57) ABSTRACT

This invention provides a system and method for detecting events related to a main power failure/blackout conditions on a commercial maritime vessel by visual detection of changes in the environment of one or more onboard areas that are visually affected by blackouts. One or more camera(s) acquire image(s) of the area to detect changes in ambient lighting that provide evidence of a blackout. Such changes in lighting can be trained as part of the visual detection process using training images comprising exemplary blackout conditions versus normal operation. Such changes in acquired image data are logged with an appropriate timestamp/condition. This data can be aggregated into statistics that can allow for determination of the root causes of the blackout and provide predictive and remedial actions to occur. This data can also be used for risk assessment (Continued)

relative to the vessel and fleet, assisting in risk management and insurance assessment.

20 Claims, 9 Drawing Sheets

(58) Field of Classification Search
USPC ........................................................ 382/100
See application file for complete search history.

(56) References Cited

U.S. PATENT DOCUMENTS

| | | | |
|---|---|---|---|
| 9,996,749 | B2 | 6/2018 | Bataller |
| 10,212,570 | B1* | 2/2019 | Ramalingam ......... H04W 4/025 |
| 10,721,375 | B1* | 7/2020 | Boyd .................... H04N 7/183 |
| 10,936,907 | B2 | 3/2021 | Suresh |
| 10,943,123 | B2* | 3/2021 | Wengrovitz ........... G06V 20/41 |
| 11,132,552 | B1 | 9/2021 | Naslavsky |
| 11,908,189 | B2 | 2/2024 | Naslavsky |
| 12,154,054 | B2 | 11/2024 | Naslavsky |
| 12,312,052 | B1* | 5/2025 | Farrell ................... B63B 39/06 |
| 2002/0075546 | A1 | 6/2002 | Webb |
| 2003/0025599 | A1 | 2/2003 | Monroe |
| 2004/0008253 | A1 | 1/2004 | Monroe |
| 2005/0055330 | A1 | 3/2005 | Britton |
| 2007/0260363 | A1 | 11/2007 | Miller |
| 2009/0102950 | A1 | 4/2009 | Ahiska |
| 2011/0257819 | A1 | 10/2011 | Chen |
| 2014/0059468 | A1 | 2/2014 | Allgair |
| 2014/0117852 | A1* | 5/2014 | Zhai ..................... H05B 47/196 |
| | | | 315/86 |
| 2017/0140603 | A1 | 5/2017 | Ricci |
| 2018/0239948 | A1 | 8/2018 | Rutschman |
| 2018/0239982 | A1 | 8/2018 | Rutschman |
| 2018/0253630 | A1 | 9/2018 | Tamer |
| 2018/0356231 | A1 | 12/2018 | Steffens |
| 2020/0012283 | A1 | 1/2020 | Nguyen |
| 2020/0064466 | A1 | 2/2020 | Harper |
| 2020/0089993 | A1 | 3/2020 | Hollander |
| 2020/0184828 | A1 | 6/2020 | Mazor |
| 2020/0264268 | A1 | 8/2020 | Moore |
| 2020/0327345 | A1 | 10/2020 | Schumacher |
| 2021/0174952 | A1 | 6/2021 | Leong |
| 2021/0357655 | A1 | 11/2021 | Park |
| 2022/0101713 | A1* | 3/2022 | Fillbrandt ............. G08B 21/08 |
| 2022/0144392 | A1 | 5/2022 | Raviv |
| 2022/0253763 | A1 | 8/2022 | Dividino |
| 2022/0261483 | A1 | 8/2022 | Tam |
| 2022/0396340 | A1 | 12/2022 | Delfs |
| 2023/0040565 | A1 | 2/2023 | Naslavsky |

FOREIGN PATENT DOCUMENTS

| | | |
|---|---|---|
| CN | 210464459 | 5/2020 |
| GB | 2609530 A | 2/2023 |
| GB | 2609560 | 2/2023 |
| JP | 5418010 | 2/2014 |
| KR | 20130137876 | 12/2013 |
| KR | 1020180055016 | 5/2018 |
| KR | 101993138 | 6/2019 |
| KR | 20210019862 | 2/2021 |
| KR | 102320142 B1 | 11/2021 |
| KR | 1020220062162 | 5/2022 |
| KR | 102023009575 | 6/2023 |
| WO | 2022269609 | 12/2022 |

OTHER PUBLICATIONS

Hiroto Honda, "Survey of Cutting-edge Computer Vision Papers—Human Recognition", DeNA Engineering, 23 pages, May 15, 2019, https://engineering.dena.com/blog/2019/05/survey-of-cutting-edge-computer-vision-papers-human-recognition/.

Qiao Dalei et al, "Marine Vision-Based Situational Awareness Using Discriminative Deep Learning: A Survey", Journal of Marine Science and Engineering, (Apr. 8, 2021), vol. 9, No. 4, doi:10.3390/jmse9040397, pp. 1-18, XP055929236.

Qiao Dalei et al. "Marine Vision-Based Situational Awareness Using Discriminative Deep Learning: A Survey", Journal of Marine Science and Engineering, vol. 9, No. 4, Apr. 8, 2021, pp. 1-18, XP055929236, DOI: 10.3390/jmse9040397 abstract.

Shanshan Zhao et al, "Deep Optical Flow Estimation Via Multi-Scale Correspondence Structure Learning", arxiv.org, (Jul. 23, 2017), 7 pages, doi:10.24963/IJCAI.2017/488, XP080778867.

Shanshan Zhou et al. "Deep Optical Flow Estimation Via Multi-Scale Correspondence Structure Learning", Arxiv.org, Cornell University Library, 201 Olin Library Cornell University Ithaca, NY 14853, Jul. 23, 2017, 7 pages, XP080778867, DOI : 10.24963/IJCAI.2017/488, abstract; figure 2.

Translated Version of CN210464459 (Year: 2020). 6 pages.

* cited by examiner

SYSTEM AND METHOD FOR AUTOMATIC DETECTION OF MARITIME BLACKOUT EVENTS

RELATED APPLICATION

This application claims the benefit of U.S. Patent Application Ser. No. 63/639,258, entitled SYSTEM AND METHOD FOR AUTOMATIC DETECTION OF MARITIME BLACKOUT EVENTS, filed Apr. 26, 2024, the teachings of which are expressly incorporated herein by reference.

FIELD OF THE INVENTION

This invention relates to systems and methods for detecting and communicating information related to maritime events, and more particularly to detection of events related to power loss and/or blackout conditions on a seagoing vessel.

BACKGROUND OF THE INVENTION

International shipping is a critical part of the world economy. Ocean-going, merchant freight vessels are employed to carry virtually all goods and materials between ports and nations. The current approach to goods shipments employs intermodal cargo containers, which are loaded and unloaded from the deck of ships, and are carried in a stacked configuration. Freight is also shipped in bulk carriers (e.g. grain) or liquid tankers (e.g. oil). The operation of merchant vessels can be hazardous and safety concerns are always present. Likewise, passenger vessels, with the precious human cargo are equally, if not more, concerned with safety of operations and adherences to rules and regulations by crew and passengers. Knowledge of the current status of the vessel, crew and cargo can be highly useful in ensuring safe and efficient operation.

Commonly assigned U.S. Pat. No. 11,132,552, entitled SYSTEM AND METHOD FOR BANDWIDTH REDUCTION AND COMMUNICATION OF VISUAL EVENTS, issued Sep. 28, 2021, by Ilan Naslavsky, et al. (the teachings of which are incorporated herein by reference) teaches a system and method that addresses problems of bandwidth limitations in certain remote transportation environments, such as ships at sea, and is incorporated herein by reference as useful background information. According to this system and method, while it is desirable in many areas of commercial and/or government activity to enable visual monitoring (manual and automated surveillance), with visual and other status sensors to ensure safe and rule-conforming operation, these approaches entail the generation and transmission of large volumes of data to a local or remote location, where such data is stored and/or analyzed by management personnel. Unlike most land-based (i.e. wired, fiber or high-bandwidth wireless) communication links, it is often much more challenging to transmit useful data (e.g. visual information) from ship-to-shore. The incorporated U.S. application teaches a system and method that enables continuous visibility into the shipboard activities, shipboard behavior, and shipboard status of an at-sea commercial merchant vessel (cargo, fishing, industrial, and passenger). It allows the transmitted visual data and associated status be accessible via an interface that aids users in manipulating, organizing and acting upon such information.

Blackout conditions occur on a commercial maritime vessel when a main generator stops working, or stalls out. The generator can stop or stall due to human error, mechanical breakage, fuel problems, failures or blockages in pumps or hoses, lubrication, etc. Notably, once the generator stops, all electrical power in the commercial vessel stops, and the lights go out. Moreover, as generators fail, this condition can lead to engine shutdown. More particular, when the generator fails, the fuel supply, cooling systems and other supporting machinery are cut off, and as a result, the engine shuts down and vessel loses propulsion and steerage.

When blackout conditions occur, this often indicates ongoing problems with the operation and maintenance of the vessel's engine and/or generators. Consequently, blackouts that occur on multiple occasions over a long time while the vessel is not close to shore or close to a hazard can reveal mis-operation and unresolved or unaddressed maintenance problems. Hence, blackout detection(s) can be a valuable indicator of operational risk aboard a vessel.

Additionally, blackout conditions often indicate loss of power and loss of control of the vessel, and if the vessel is navigating close to shore or close to a hazard, this can be a highly dangerous situation, as has been evidenced by the recent Key Bridge collapse in Baltimore Harbor. Loss of propulsion and steerage can lead to severe consequences including grounding, collision, environmental pollution, damage to property and loss of life. Identification of blackouts onboard, which often go unreported, can assist in mitigating risk of severe consequences, identifying root causes and increasing safety.

SUMMARY OF THE INVENTION

This invention overcomes disadvantages of the prior art by providing a system and method for detecting events related to a main power failure/blackout conditions on a (e.g.) seagoing commercial/merchant maritime vessel by visual detection of changes in the environment of one or more onboard areas that are visually affected by blackouts. The system and method uses one or more cameras that acquire images of the area (for example, an engine room) to detect changes in ambient lighting that provide evidence of a blackout. This can include detection of changes in lighting over a predetermined time interval between acquired images of the area. Such changes in lighting can be trained (for example using deep learning processes) as part of the visual detection process using training images comprising exemplary blackout conditions versus normal operation. Such changes in acquired image data are logged with an appropriate timestamp and the process determines the nature and duration of the blackout event therefrom. This data can be aggregated into statistics that can allow for determination of the root causes of the blackout and provide predictive and remedial actions to occur. This data can also be used for risk assessment relative to the vessel and fleet, assisting in risk management and insurance assessment.

In an illustrative embodiment, a system and method is provided, for automatically detecting a blackout condition in a commercial maritime vessel with at least one camera mounted in an area containing lighting on a maritime vessel as part of an automated visual event detection system. At least one processor is adapted to receive image data over a local network from the at least one camera and generate visual event information relative to the data. A communication link transmits the visual event information from the processor to a land-based remote computer system that stores, analyzes and displays the visual event information. A data store, associated with the processor, receives image data from the camera of an imaged scene on the vessel. The data store provides live images of the scene and stores reference images of the scene associated with a plurality of conditions. An uninterruptible power supply is interconnected to each of the at least one camera, the local network, the processor and the data store. A blackout determination process periodically compares one or more reference image(s) of the area to a set of the conditions in one or more acquired current image(s) of the area by the at least one camera, and determines therefrom whether the blackout conditions are present based upon the acquired current images. Illustratively, a communication link can communicate the visual event information, in which the link defines a reduced bandwidth, and wherein the information is transmitted in an order as part of a hierarchy of even information based upon significance thereof. A storage arrangement can store the visual event information, including a time and a duration of the blackout event in a land-based database on shore or in a cloud data storage. The visual event information can include subordinate information, including at least one of vessel location, vessel speed, weather conditions, and vessel navigation status. The blackout determination process can derive a brightness histogram, respectively, for each of the one or more current image(s) and compares it to brightness or a brightness histogram for each of the reference image(s). The reference image(s) can comprise images of lighting conditions in the area under each of normal lighting, blackout and emergency lighting conditions in the area at one or more times of day. Illustratively, the land-based remote computer system performs blackout detection analytics aggregating results over time by an individual vessel and by a fleet of vessels. The analytics can compare the results with benchmarks and reports thereon via a display, and/or can produce a digital log file of all blackout events, including location, speed, weather condition, and other operational and navigation status information.

BRIEF DESCRIPTION OF THE DRAWINGS

The invention description below refers to the accompanying drawings, of which.

DETAILED DESCRIPTION

I. System Overview

Figure 1:
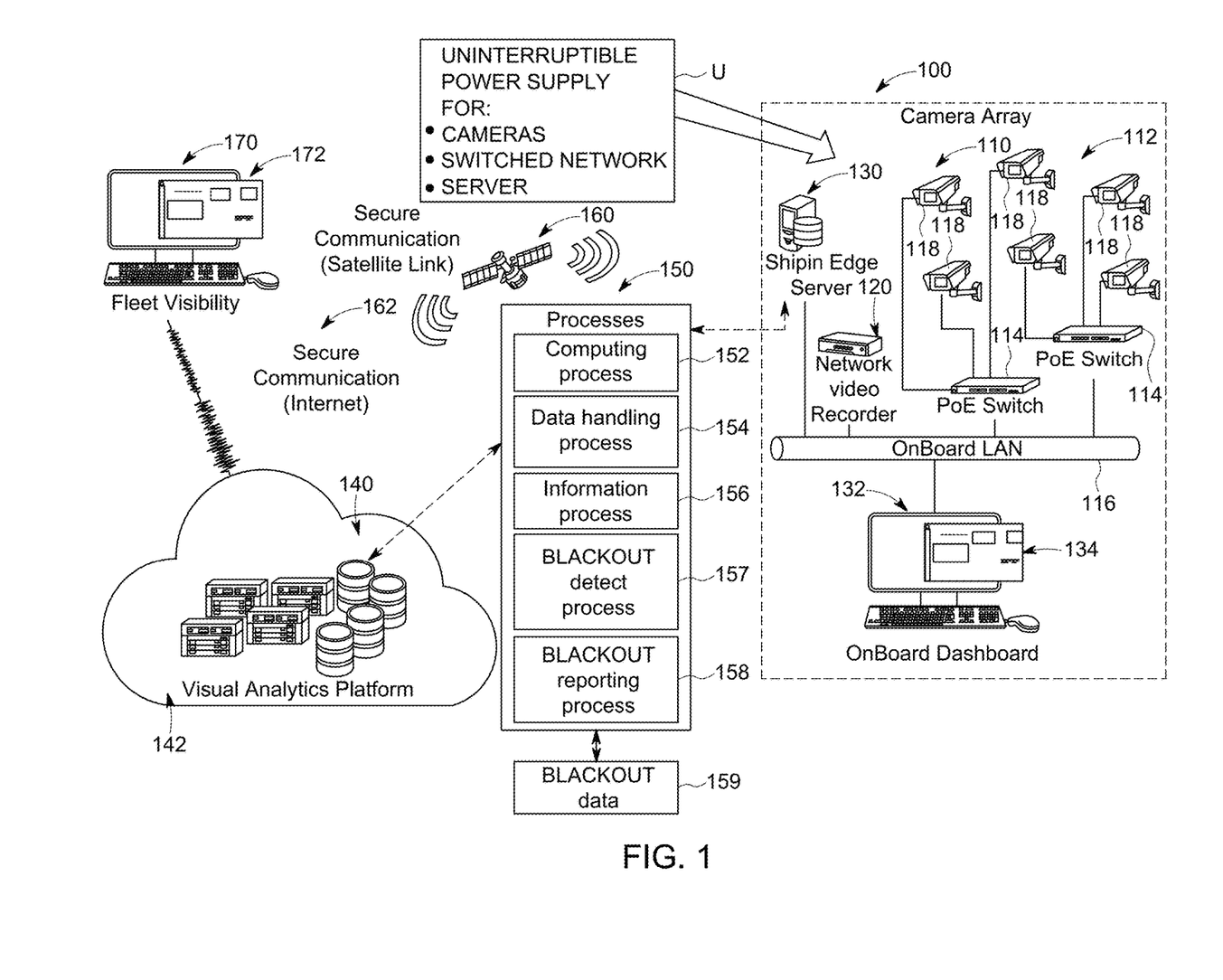
FIG. 1 is a diagram showing an overview of a system and associated method for acquiring, transmitting analyzing and reporting visual and other sensor information with respect to a communication link, including processes/ors for automatically diagnosing/detecting physical and electronic problems related to visual sensors, tracking the time (date stamp) when operational issue(s) occur, automatically repairing operational issue(s), and restoring and/or reporting the issue(s), including possible blackout conditions, according to an illustrative embodiment.
Figure 1A:
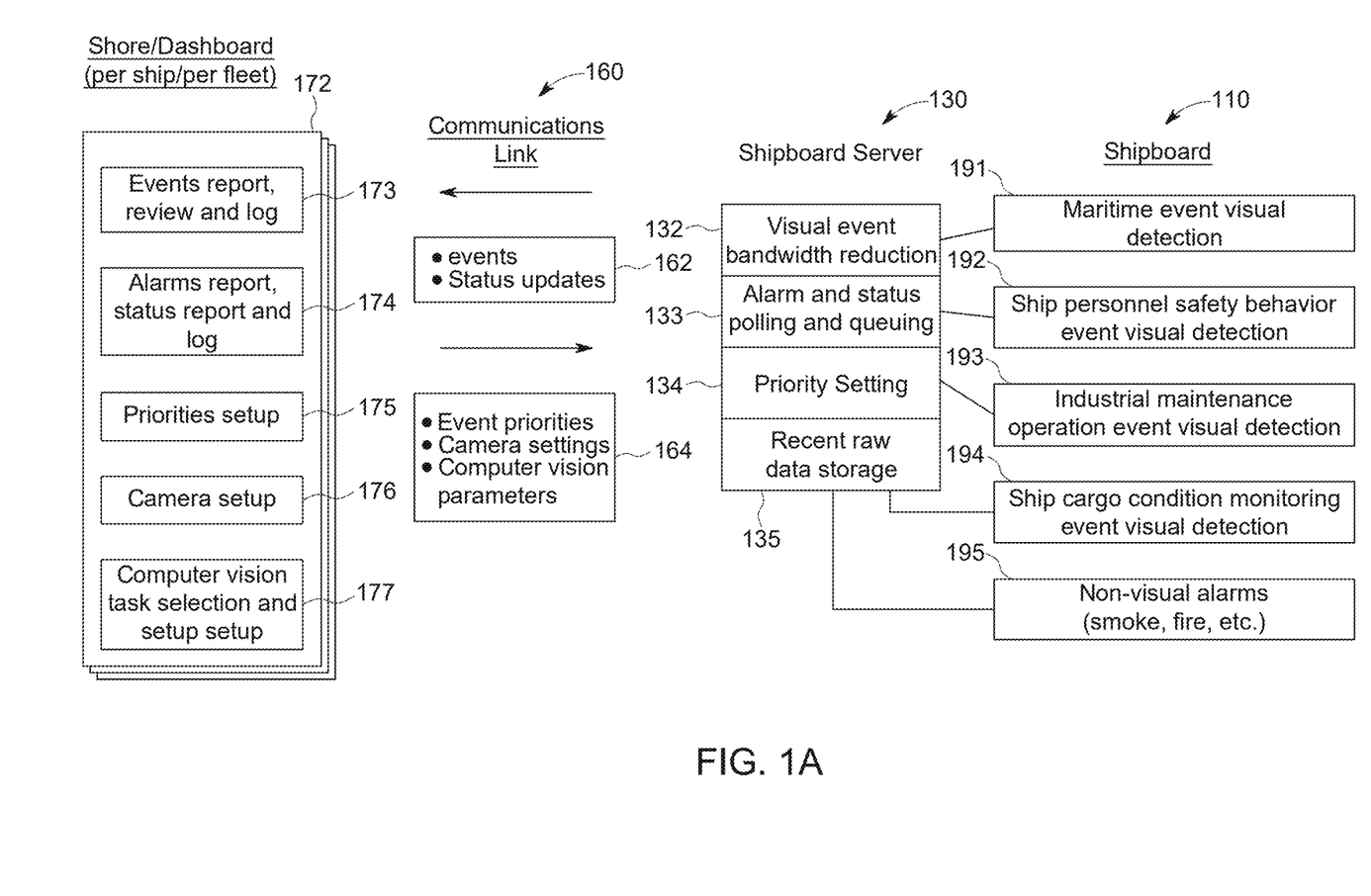
FIG. 1A is a block diagram showing data and operations employed by the system and method of FIG. 1.

FIGS. 1 and 1A show an arrangement 100 for tracking and reporting upon visual, and other, events generated by visual sensors aboard ship that create video data streams, visual detection of events aboard ship based on those video data streams, aggregation of those visual detections aboard ship, prioritization and queuing of the aggregated detections into events, optional bandwidth reduction of the video data streams in combination with the aggregated events, sending the events over the reduced bandwidth communications channel to shore, reporting the events to a user-interface on shore, and further aggregation of the events from multiple ships and multiple time periods into a fleet-wide aggregation that can present information over time. The system and method herein further provides the ability to configure and setup the system described above to select or not select events for presentation in order to reduce confusion for the person viewing the dashboard as well as to set the priority for communicating particular events or classes of events. Such communication can optionally occur over the reduced bandwidth communications channel so that the most important events are communicated at the expense of less important events.

FIG. 1, the arrangement 100 particularly depicts a shipboard location 110 includes a camera (visual sensor) array 112 comprising a plurality of discrete digital cameras 118 (and/or other appropriate environmental/event-driven sensors) that are connected to wired and/or wireless communication links (e.g. that are part of a TCP/IP LAN or other protocol-driven data transmission network 116) via one or more switches, routers, etc. 114. Image (and other) data from the (camera) sensors 118 is transmitted via the network 116. Note that cameras can provide analog or other format image data to a remote receiver that generates digitized data packets for use of the network 116. The cameras 118 can comprise conventional machine vision cameras or sensors (based upon CMOS, CCD, etc.) operating to collect raw video or digital image data, which can be based upon two-dimensional (2D) and/or three-dimensional (3D) imaging. Furthermore, the image information can be grayscale (monochrome), color, and/or near-visible (e.g. infrared (IR)). Likewise, other forms of event-based cameras can be employed.

Note that data used herein can include both direct feeds from appropriate sensors and also data feeds from other data sources that can aggregate various information, telemetry, etc. For example, location and/or directional information can be obtained from navigation systems (GPS etc.) or other systems (e.g. via APIs) through associated data processing devices (e.g. computers) that are networked with a server 130 for the system. Similarly, crew members can input information via an appropriate user interface. The interface can request specific inputs—for example logging into or out of a shift, providing health information, etc.—or the interface can search for information that is otherwise input by crew during their normal operations—for example, determining when a crew member is entering data in the normal course of shipboard operations to ensure proper procedures are being attended to in a timely manner.

The shipboard location 110 can further include a local image/other data recorder 120. The recorder can be a stand-alone unit, or part of a broader computer server arrangement 130 with appropriate processor(s), data storage and network interfaces. The server 130 can perform generalized shipboard, or dedicated, to operations of the system and method herein with appropriate software. The server 130 communicates with a work station or other computing device 132 that can include an appropriate display (e.g. a touchscreen) 134 and other components that provide a graphical user interface (GUI). The GUI provides a user on board the vessel with a local dashboard for viewing and controlling manipulation of event data generated by the sensors 118 as described further below. Note that display and manipulation of data can include, but is not limited to enrichment of the displayed data (e.g. images, video, etc.) with labels, comments, flags, highlights, and the like.

The information handled and/or displayed by the interface can include a workflow provided between one or more users or vessels. Such a workflow would be a business process where information is transferred from user to user (at shore or at sea interacting with the application over the GUI) for action according to the business procedures/rules/policies. This workflow automation can be implemented in a variety of manners that include a computer and network arrangement, and in an embodiment, can be referred to as "robotic process automation."

The processes 150 that run the dashboard and other data-handling operations in the system and method can be performed in whole or in part with the on-board server 130, and/or using a remote computing (server) platform 140 that is part of a land-based, or other generally fixed, location with sufficient computing/bandwidth resources (a base location 142). The processes can generally include 150 a computation process 152 that handles sensor data to meaningful events. This can include machine vision algorithms and similar procedures. A data-handling process 154 can be used to derive events and associated status based upon the events—for example movements of the crew and equipment, cargo handling, etc. An information process 156 can be used to drive dashboards for one or more vessels and provide both status and manipulation of data for a user on the ship and at the base location.

Data is communicated between the ship (or other remote location) 110 and the base 142 occurs over one or more wireless channels, which can be facilitated by a satellite uplink/downlink 160, or another transmission modality—for example, long-wavelength, over-air transmission. Moreover, other forms of wireless communication can be employed such as mesh networks and/or underwater communication (for example long-range, sound-based communication and/or VLF). Note that when the ship is located near a land-based high-bandwidth channel or physically connected by—wire while at port, the system and method herein can be adapted to utilize that high-bandwidth channel to send all previously unsent low-priority events, alerts, and/or image-based information.

The (shore) base server environment 140 communicates via an appropriate, secure and/or encrypted link (e.g. a LAN or WAN (Internet)) 162 with a user workstation 170 that can comprise a computing device with an appropriate GUI arrangement, which defines a user dashboard 172 allowing for monitoring and manipulation of one or more vessels in a fleet over which the user is responsible and manages.

Figure 1B:
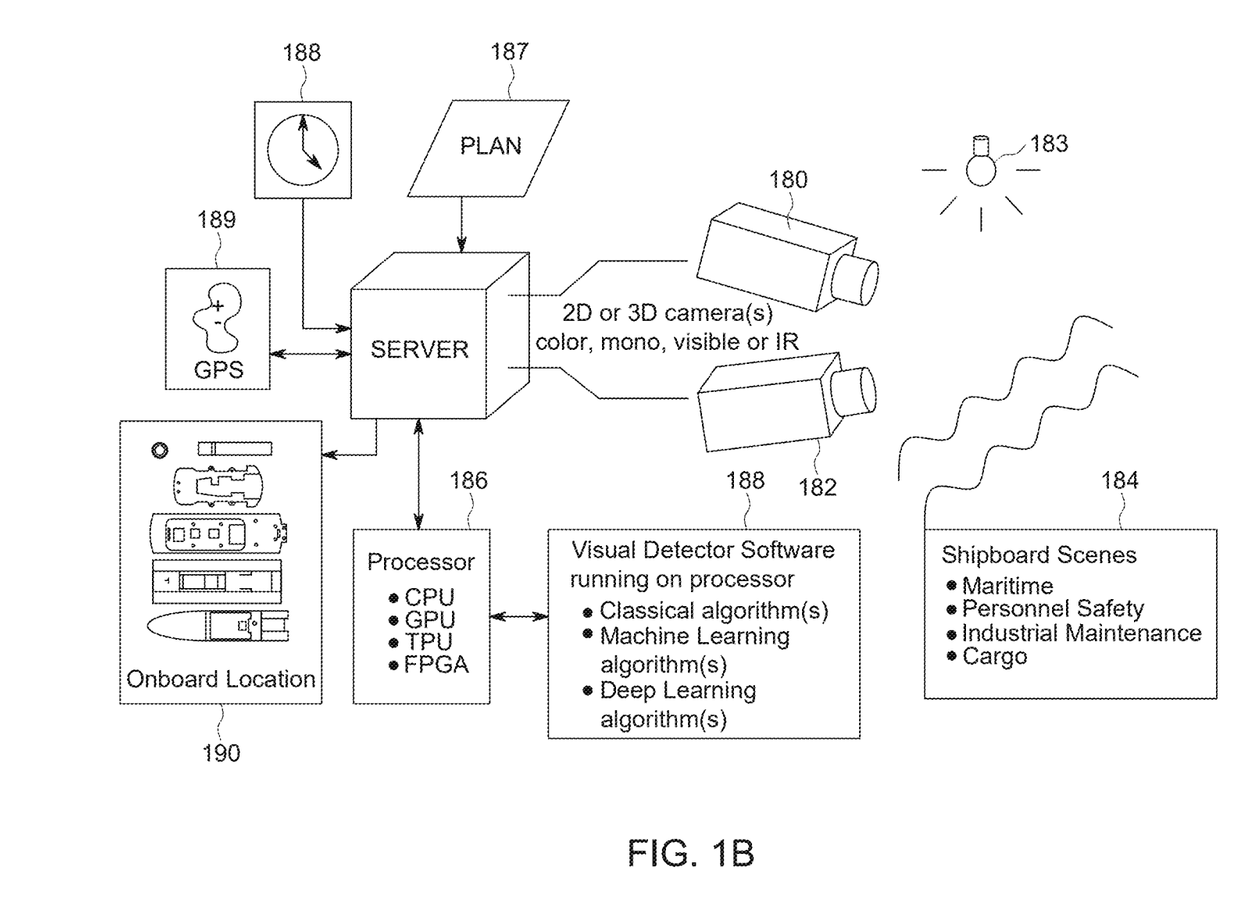
FIG. 1B is a diagram showing acquisition of images and other data for expected event detection according to the system and method of FIG. 1.

Referring further to FIG. 1A, the data handled by the system is shown in further detail. The data acquired aboard the vessel environment 110, and provided to the server 130 can include a plurality of possible, detected visual (and other sensor-based) events. These events can be generated by action of software and/or hardware based detectors that analyze visual images and/or time-sequences of images acquired by the cameras. With further reference to FIG. 1B, visual detection is facilitated by a plurality of 2D and/or 3D camera assemblies depicted as cameras 180 and 182 using ambient or secondary sources of illumination 183 (visible and/or IR). The camera assemblies image scenes 184 located on board (e.g.) a ship. The scenes can relate to, among other subjects, maritime events, hull and machinery, personnel safety and/or cargo, and cameras can be mounted to image a variety of locations on the (e.g.) sea-going cargo vessel, including the bridge, deck, hold(s), engine room(s), machinery room(s), steering gear room, crew quarters, hallways, etc. The images are directed as image data to the event detection server or processor 186 that also receives inputs from a plan or program 187 that characterizes events and event detection and a clock 188 that establishes a timeline and timestamp for received images. The event detection server or processor 186 can also receive inputs from a GPS receiver 189 to stamp the position of the ship at the time of the event and can also receive input from an architectural plan 190 of the exemplary sea-going cargo vessel (that maps onboard locations on various decks) to stamp the position of the sensor within the vessel that sent the input. The event server/processor 186 can comprise one or more types and/or architectures of processor(s), including, but not limited to, a central processing unit (CPU—for example one or more processing cores and associated computation units), a graphical processing unit (GPU—operating on a SIMD or similar arrangement), tensor processing unit (TPU) and/or field programmable gate array (FPGA—having a generalized or customized architecture).

Referring again to FIG. 1A, the base location dashboard 172 is established on a per-ship and/or per fleet basis and communicates with the shipboard server 130 over the communications link 160 in a manner that is optionally reduced in bandwidth, and possibly intermittent in performing data transfer operations. The link 160 transmits events and status updates 162 from the shipboard server 130 to the dashboard 172 and event priorities, camera settings and vision system parameters 164 from the dashboard 172 to the shipboard server. More particularly, the dashboard displays and allows manipulation of events reports and logs 173, alarm reports and logs 174, priorities for events, etc. 175, camera setup 176 and vision system task selection and setup relevant to event detection, etc. 177. The shipboard server 130 includes various functional modules, including visual event bandwidth reduction 132 that facilitates transmission over the link 160; alarm and status polling and queuing 133 that determines when alarms or various status items have occurred and transmits them in the appropriate priority order; priority setting 134 that selects the priorities for reporting and transmission; and a data storage that maintains image and other associated data from a predetermined time period 135.

II. Visual Detectors

As shown in FIG. 1B, various imaged events are determined from acquired image data using appropriate processes/algorithms 188 performed by the processor(s) 186. These can include classical algorithms, which are part of a conventional vision system, such as those available from (e.g.) Keyence, Cognex Corporation, MVTec, or HIKVision. Alternatively, the classical vision system could be based on open source such as OpenCV. Such classical vision systems can include a variety of vision system tools, including, but not limited to, edge finders, blob analyzers, pattern recognition tools, etc. The processor(s) 186 can also employ machine learning algorithms or deep learning algorithms, which can be custom built or commercially available from a variety of sources, and employ appropriate deep-learning frameworks such as caffe, tensorflow, torch, keras and/or OpenCV. The network could be a mask R-CNN or Yolov3 detector. See also URL address https://engineer.dena.com/posts/2019.05/survey-of-cutting-edge-computer-vision-papers-human-recognition/on the WorldWideWeb.

As shown in FIG. 1A, the visual detectors relate to maritime events 191, ship personnel safety behavior and events 192, hull and machinery maintenance operation and events 193, ship cargo condition and events related thereto 194, and/or non-visual alarms, such as smoke, fire, and/or toxic gas detection via appropriate sensors. By way of non-limiting example, some particular detected events and associated detectors relate to the following:

(a) A person is present at their station at the expected time and reports the station, start time, end time, and elapsed time;

(b) A person has entered a location at the expected time and reports the location, start time, end time, and elapsed time;

(c) A person moved through a location at the expected time and reports the location, start time, end time, and elapsed time;

(d) A person is performing an expected activity at the expected location at the expected time and reports the location, start time, end time, and elapsed time—the activity can include (e.g.) watching, monitoring, installing, hose-connecting or disconnecting, crane operating, tying with ropes;

(e) a person is running, slipping, tripping, falling, lying down, using or not using handrails at a location at the expected time and reports the location, start time, end time, and elapsed time;

(f) A person is wearing or not wearing protective equipment when performing an expected activity at the expected location at the expected time and reports the location, start time, end time, and elapsed time-protective equipment can include (e.g.) a hard-hat, left or right glove, left or right shoe/boot, ear protection, safety goggles, life-jacket, gas mask, welding mask, or other protection;

(g) A door is open or closed at a location at the expected time and reports the location, start time, end time, and elapsed time;

(h) An object is present at a location at the expected time and reports the location, start time, end time and elapsed time—the object can include (e.g.) a gangway, hose, tool, rope, crane, boiler, pump, connector, solid, liquid, small boat and/or other unknown item;

(i) That normal operating activities are being performed using at least one of engines, cylinders, hose, tool, rope, crane, boiler, and/or pump; and (j) That required maintenance activities are being performed on engines, cylinders, boilers, cranes, steering mechanisms, HVAC, electrical, pipes/plumbing, and/or other systems.

Note that the above-recited listing of examples (a-j) are only some of a wide range of possible interactions that can for the basis of detectors according to illustrative embodiments herein. Those of skill should understand that other detectable events involving person-to-person, person-to-equipment or equipment-to-equipment interaction are expressly contemplated.

In operation, an expected event visual detector takes as input the detection result of one or more vision systems aboard the vessel. The result could be a detection, no detection, or an anomaly at the time of the expected event according to the plan. Multiple events or multiple detections can be combined into a higher-level single events. For example, maintenance procedures, cargo activities, or inspection rounds may result from combining multiple events or multiple detections. Note that each visual event is associated with a particular (or several) vision system camera(s) 118, 180, 182 at a particular time and the particular image or video sequence at a known location within the vessel. The associated video can be optionally sent or not sent with each event or alarm. When the video is sent with the event or alarm, it may be useful for later validation of the event or alarm. In addition to compacting the video by reducing it to a few images or short-time sequence, the system can reduce the images in size either by cropping the images down to significant or meaningful image locations required by the detector or by reducing the resolution say from the equivalent of high-definition (HD) resolution to standard-definition (SD) resolution, or below standard resolution.

The shipboard server establishes a priority of transmission for the processed visual events that is based upon settings provided from a user, typically operating the on-shore (base) dashboard. The shipboard server buffers these events in a queue in storage that can be ordered based upon the priority. Priority can be set based on a variety of factors—for example personnel safety and/or ship safety can have first priority and maintenance can have last priority, generally mapping to the urgency of such matters. By way of example, all events in the queue with highest priority are sent first. They are followed by events with lower priority. If a new event arrives shipboard with higher priority, then that new higher priority event will be sent ahead of lower priority events. It is contemplated that the lowest priority events can be dropped if higher priority events take all available bandwidth. The shipboard server receives acknowledgements from the base server on shore and confirms that events have been received and acknowledged on shore before marking the shipboard events as having been sent. Multiple events may be transmitted prior to receipt (or lack of receipt) of acknowledgement. Lack of acknowledgement potentially stalls the queue or requires retransmission of an event prior to transmitting all next events in the priority queue on the server. The shore-based server interface can configure or select the visual event detectors over the communications link. In addition to visual events, the system can transmit non-visual events like a fire alarm signal or smoke alarm signal.

III. Detection Flow

Figure 2:
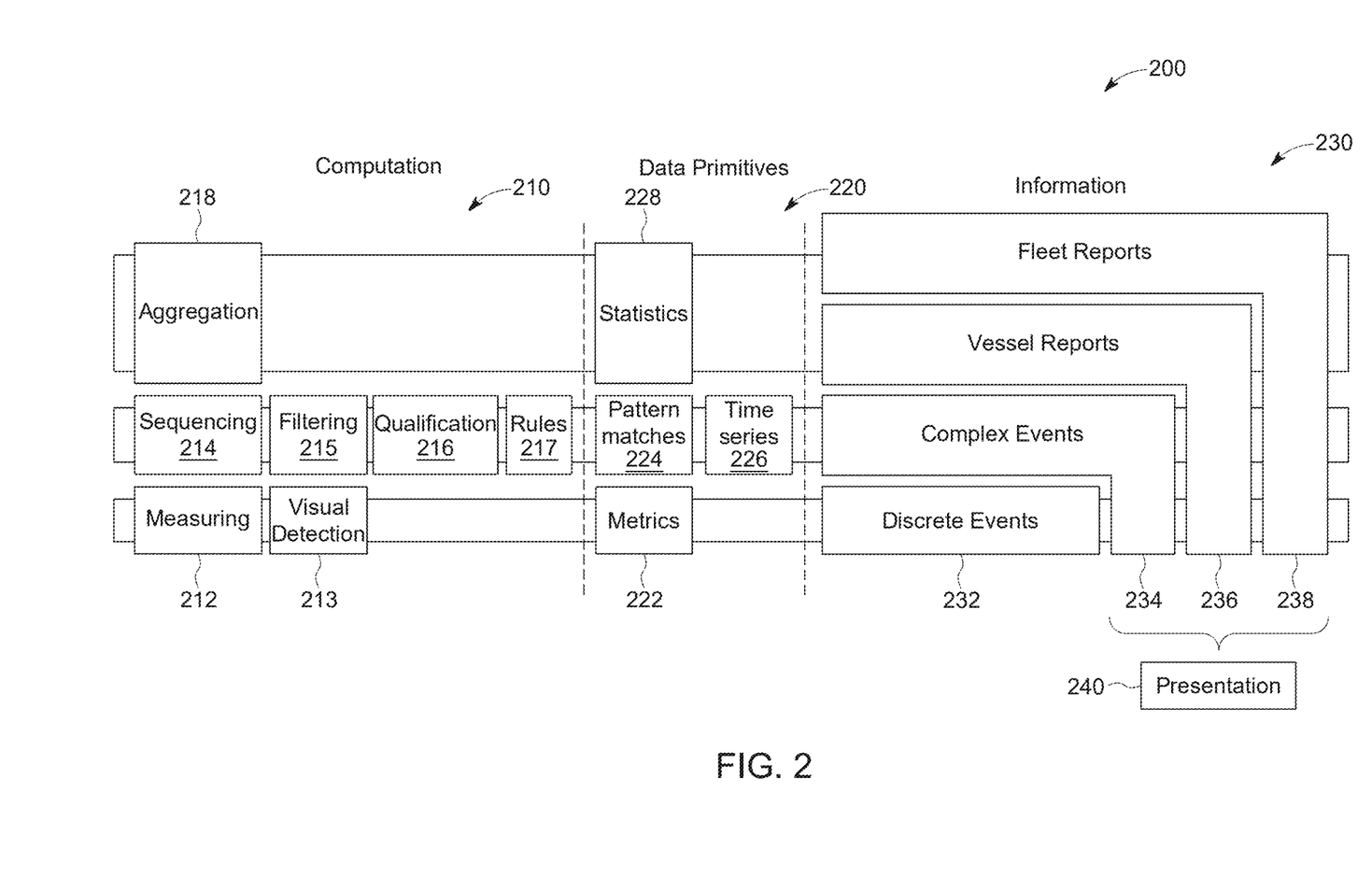
FIG. 2 is a flow diagram showing detection and reporting of visual events and associated data by the processors and processes of the system and method of FIG. 1.

As shown in FIG. 2, an exemplary operating procedure 200 for generalized detection flow used in performing the system is shown. The operation can be characterized in three phases or segments, computation 210, generation of data primitives 220 and information creation 230 and presentation 240 to users via the shore-based dashboard. Alternatively, some or all of the functions herein can be implemented by users via a ship-based dashboard, which affects programming on at least one of the local server or the base server. The shipboard dashboard can also act as a passive terminal that transmits instructions back to the base interface over the communications link so that such instructions can be acted upon through the base. The computation phase 210 comprises measurement 212 using sensors and performing visual detection 213. These generate a set of metrics 222 that are displayed to the user as discrete events 232. The computation phase 210 uses event sequencing (priority) 214, filtering (via cropping, compression, etc.), and qualification of events 216 based upon rules 217 to provide pattern matches 224 according to a time series of events 226. This data is presented as complex events 234. These complex events 234 can comprise a scenario, such as a maintenance task successfully performed, or the occurrence of a safety breach. The computation phase 210 can aggregate visual and other events 218 and derive statistics 228—for example the number of safety breaches over a time interval, etc. These statistics 228 can be presented to the shore-based user as individual vessel reports 236 and fleet reports 238 that provide valuable information to the user regarding behavior and performance at various factors related to the events in aggregate.

Figure 3:
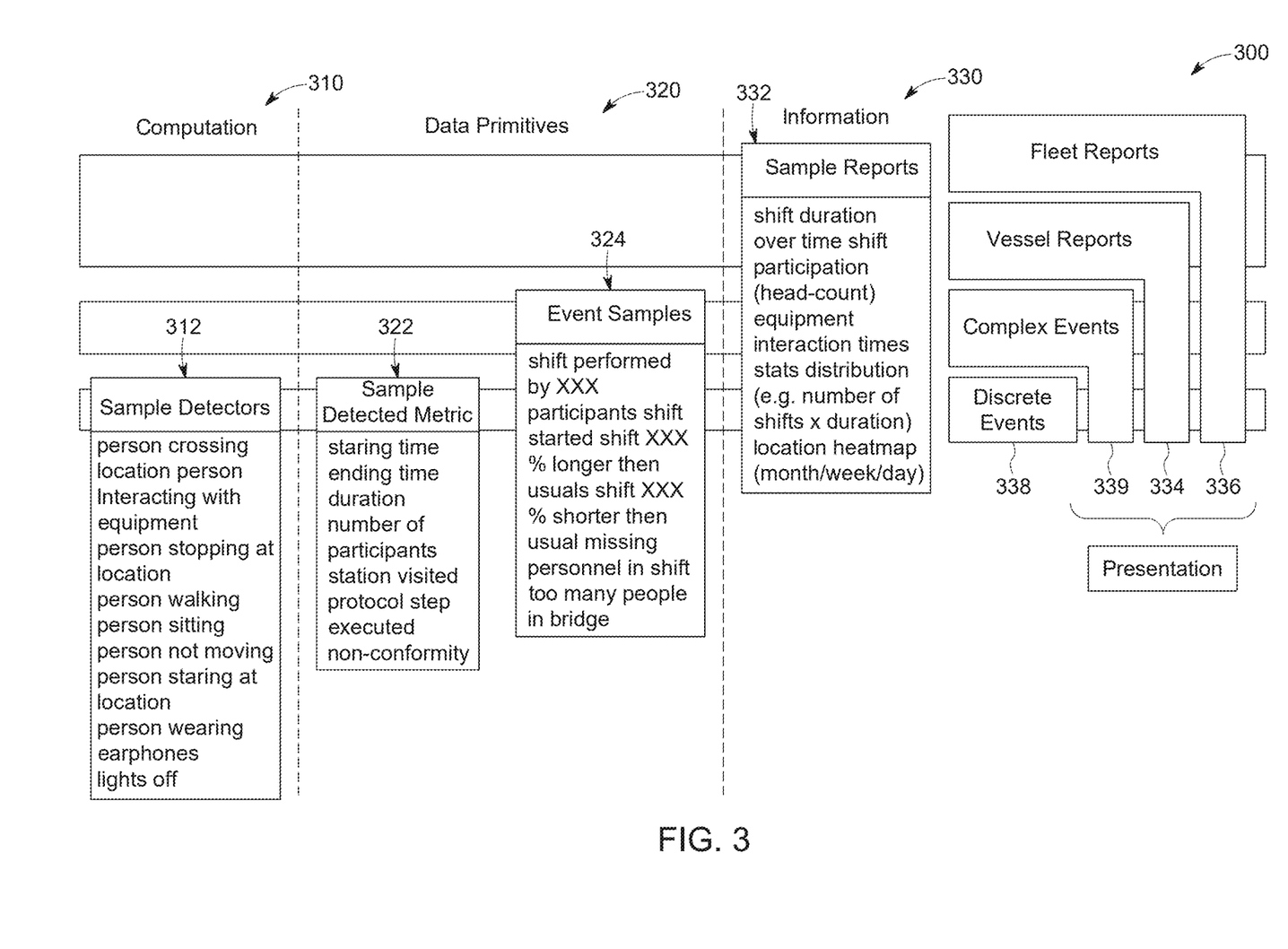
FIG. 3 is a flow diagram showing the detection of visual events using processors and processes of the system and method of FIG. 1 in the example of a bridge routine on a sea-going merchant/cargo vessel.

FIG. 3 shows a detection flow procedure 300 in the example of bridge routines for one or more vessels in a fleet. At the computation phase 310, the sample detectors 312 provided by visual and other detectors include (e.g.) a person crossing or stopping at a location, a person interacting with equipment, a person walking, sitting, not-moving (stationary), a person staring at a location, a person wearing earphones and/or lights off at the location. In the associated data primitives generation phase 320, sample detected metrics 322 are provided, including (e.g.) starting time and ending time, duration, number of participants, the bridge station visited, a protocol step executed and a non-conformity with protocols. Event samples 324 can include participant name(s) identified as performing the shift, when the shift started, whether a given participant's shift was longer or shorter than normal, missing personnel and/or excess/unauthorized personnel on the bridge. In the exemplary information phase sample reports 332 are created that can include (e.g.) shift duration over time, shift participation (head count), equipment interaction time statistics, distribution—for example number of shifts X duration and a location graph (e.g. a heat map) that can be based upon month, week, day, etc. In the information phase 330, the sample reports 332 can be presented as vessel reports 334 and fleet reports. Sample detected metrics 322 and event samples 324 can be presented to the user as discrete events 338 and complex events 339.

Figure 4:
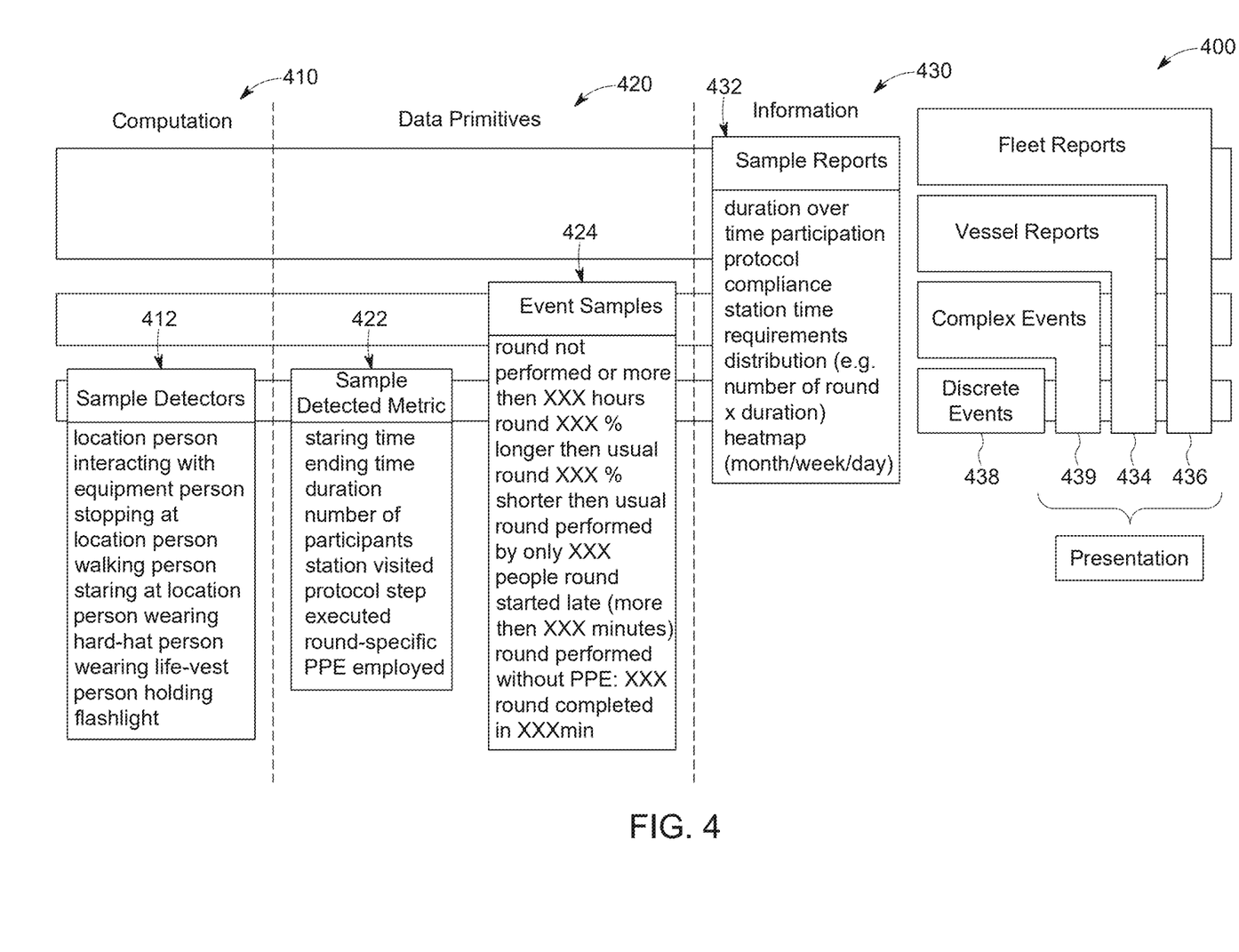
FIG. 4 is a flow diagram showing the detection of visual events using processors and processes of the system and method of FIG. 1 in the example of the performance of safety rounds by personnel (crew) on a sea-going merchant vessel.

FIG. 4 shows a detection flow procedure 400 in the example of safety rounds for one or more vessels in a fleet. At the computation phase 410, the sample detectors 412 provided by visual and other detectors include (e.g.) the location of the event, person interacting with equipment, person stopping at a location, person walking or staring at a location, person wearing a hard-hat, life vest or other protective equipment and/or holding a safety tool, such as a fire extinguisher, flashlight, etc. In the data primitives phase 420 sample detected metrics can include (e.g.) starting or ending time of an event, duration, number of participants, station visited protocol step executed and/or round-specific protective equipment (PPE) employed. Event samples 424 can include whether a safety round was not performed for a predetermined number of hours and a round taking X % more or less time than normal, a round performed by X number of personnel, a round started late by X minutes, a round performed without needed PPE and/or a round completed in X minutes. The information phase 432 provides sample reports 432, based upon events, including duration over time, participation, safety protocol compliance, station time requirements, distribution (e.g. number of rounds X duration) and/or a graph/heat map based upon month, day, week, etc. Vessel reports 434 and fleet reports 436. The information phase 430 also reports discrete events 438 and complex events 439 based upon sample detected events 422 and event samples 424.

Figure 5:
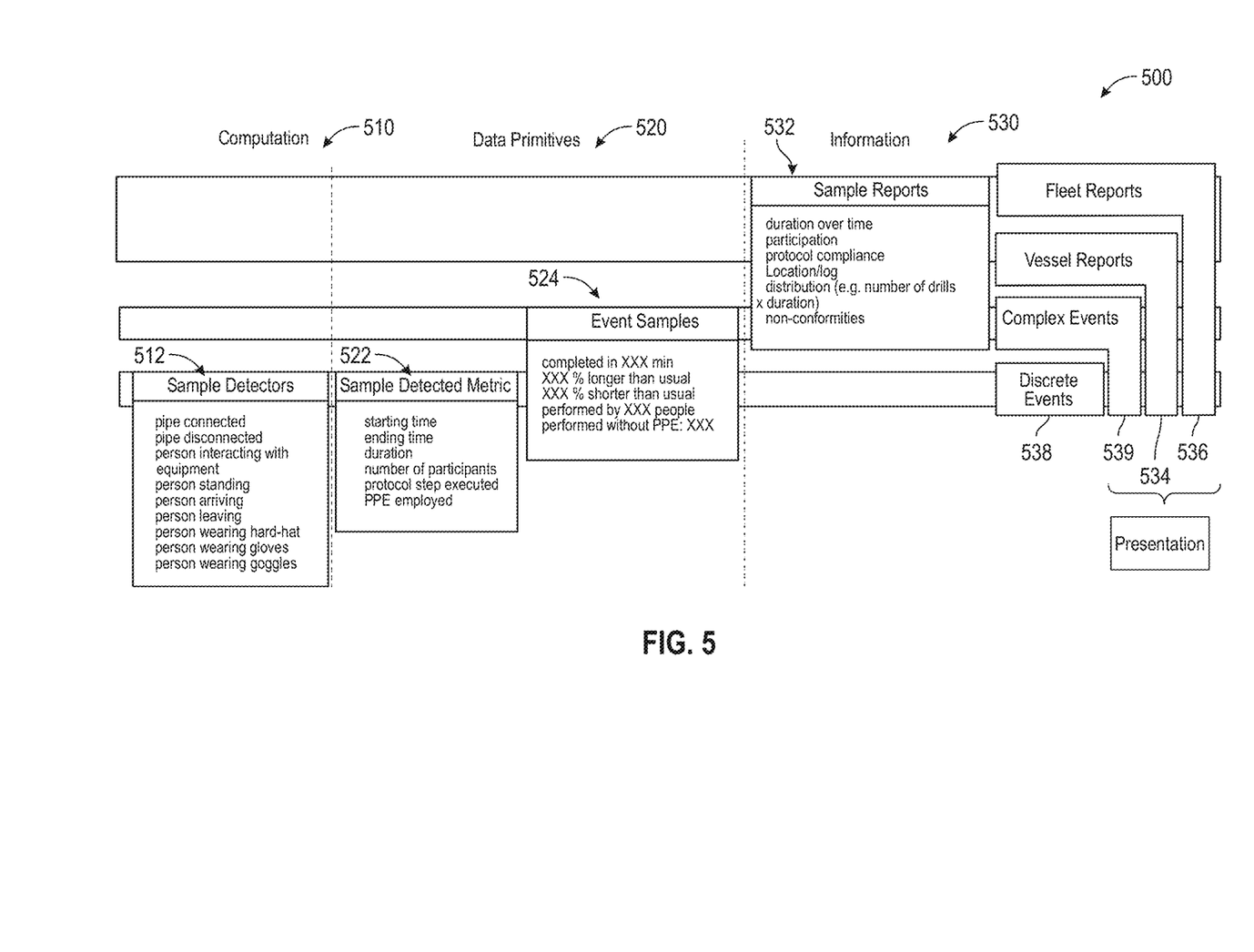
FIG. 5 is a flow diagram showing the detection of visual events using processors and processes of the system and method of FIG. 1 in the example of performing activities with respect to cargo handling on a sea-going merchant vessel.

FIG. 5 shows a detection flow procedure 500 in the example of cargo operations for one or more vessels in a fleet. At the computation phase 510, sample detectors 512 can include a pipe connected, a pipe disconnected, a person interacting with equipment, a person standing, arriving or leaving, a person wearing a hard-hat, gloves, goggles and/or other PPE. The data primitives phase 520 provides sample detected metrics 522 include starting and ending time, duration number of personnel participating, a protocol step executed and/or PPE employed in the task(s). Event samples 524 can include a task complete in X minutes, task completion X % larger or shorter than usual, the task performed by X personnel and/or a task performed without (free of) PPE of X type. In the information phase 530 sample reports 532 can include duration over time, participation, protocol compliance, location/log, distribution (e.g. number of drills X duration) and/or non-conformities versus normal/standard operation. These can be presented as vessel reports 534 or fleet reports 536. Sample detected metrics 522 and event samples 524 are reported as discrete events 538 and complex events 539.

Other exemplary detection flows can be provided as appropriate to generate desired information on activities of interest by the ship's personnel and systems. Such detection flows employ relevant detector types, parameters, etc. Likewise, the mechanism to carry out detection can vary. In an alternate arrangement, expressly contemplated herein, event detectors can be partially or fully implemented using appropriate deep learning software algorithms/non-transitory computer-readable program instructions implemented on the shore-based and/or vessel-based processor(s). By way of non-limiting example an implementation of a "hybrid" detector arrangement using deep learning/artificial intelligence is shown and describe in commonly assigned U.S. patent application Ser. No. 17/873,053, entitled SYSTEM AND METHOD FOR AUTOMATIC DETECTION OF VISUAL EVENTS IN TRANSPORTATION ENVIRONMENTS, filed Jul. 25, 2022, the teachings of which are expressly incorporated by reference as useful background information.

IV. Blackout Detection and Determination

A. Operational Overview

In an illustrative embodiment, the system and method herein allows for automatically diagnosing/detecting physical and electronic problems related to visual sensors (e.g. cameras and/or other forms of sensors with a visual functionality such as 3D cameras, etc.), keeping track of when operational issue(s) occur with such camera(s), automatically repairing the operational issue(s), and restoring and/or reporting the issue(s) to a local crew so that the problem can be manually corrected. The visual sensors/cameras are used to monitor and generate visual events using the above-described arrangement 100 and/or equivalent implementations thereof. Generated and stored event data is used in real time and near-real time (e.g. with normal system transmission/processing latency), and at subsequent times, to generate useful and relevant information on vessels and fleets.

With reference again to the system arrangement 100 of FIG. 1, the processing arrangement 150 includes an automatic blackout condition detection/determination module 157 and a blackout reporting process (or) or module 158. In general, one or more of the cameras 118 are arranged to image an area (or multiple areas) of the vessel that are dependent upon electrical lighting to provide visibility for the crew. Such areas can be fully (or predominantly) windowless spaces in the ship's interior, such as an engine room, cargo hold, mechanical room, etc. Such areas typically contain two types of lighting—that which is powered by the ships main electrical power supply (generators), and that which is powered by local or centralized emergency generators and/or backup batteries in the form of emergency lighting. In normal operation, some or all of the normal lighting as well as the emergency lighting remains on to light the area. If a power outage occurs due to a generator malfunction or stall (a blackout condition), then after a predetermined delay, the emergency lighting alone automatically activates. This is because the emergency lighting senses power from the main power circuit and detects when it is no longer present and is able to run from the emergency power circuit. This emergency lighting remains activated until normal power is restored, at which time the live circuit is detected and normal lighting is restored.

Thus, the lighting profile of the imaged area defines a plurality of discrete characteristics that change over time. Thus, a series of acquired images can be stored and analyzed by operation the detection/determination process 157 with respect to the server and associated data storage 130. This image data and the results of the determination pass over the network (LAN) 116, which consists of switches, routers and other components that allow passage of data packets via (e.g. TCP/IP) appropriate network protocols. In an exemplary embodiment, power to the cameras 118 and/or other networked components can be delivered via Power-over-Ethernet (POE) in a conventional manner via the switch(es) 114. To allow the acquisition and accumulation of image data from one or more area(s) affected by power loss/blackout a battery-based (or other power storage modality, such as ultracapacitor-based) uninterruptible/backup power supply (UPS) of appropriate size and current capacity can be connected to one or more of the components in the arrangement 110 that serves the subject area(s) of the vessel. Individual battery backups can be included in camera(s) and/or a main backup UPS can be provided to the network for delivery of PoE to the camera(s), as well as powering associated switches, routers etc. Some or all of the server 130 and/or recorded 120 is/are also subject to backup power via the same or different power supply arrangement (U) to ensure its ability to handle and store image data acquired during a blackout. As described below, the acquired images of the area(s) are compared by the detection process 157 to trained images of normal lighting conditions for that area, as well as various training images acquired by the same camera(s) during a power loss (e.g. dark) condition and emergency lighting condition (associated with the time of day when the acquisition occurs) to detect a power-loss condition, as well as an emergency-lighting condition, and subsequent restoration of normal, generator-based power to the vessel.

The actual functions of these modules/processes (152-158) can be arranged in a variety of ways and instantiated on the shore-based server platform(s) 140 (via visual analytics 142), the vessel-based server 130, or both. Reports 159 existence, timing and surrounding circumstances (e.g. navigation data, engine and generator telemetry, etc.) associated with one or more blackout event(s) over a given time period can be generated for display to a user on a local or remote interface dashboard (e.g. 134 or 172, respectively). As described below, the dashboard can display information about a single vessel's camera's and/or about an entire fleet's cameras in accordance with the teachings of above-incorporated U.S. Pat. No. 11,908,189. Blackout reports can also be part of a risk assessment function, such as described in commonly assigned U.S. patent application Ser. No. 17/973,675, entitled SYSTEM AND METHOD FOR MARITIME VESSEL RISK ASSESSMENT IN RESPONSE TO MARITIME VISUAL EVENTS, filed Oct. 26, 2022, the teachings of which are incorporated by reference as useful background information.

B. System Operation

More generally, the system and method herein automatically visually detects maritime blackout events by using one or more camera(s) connected to a processor that measures the distribution of light in an area of predictable lighting, such as the engine room (or another interior compartment fitted with critical machinery) of a commercial seagoing maritime vessel. It is recognized that, typically, all lights in the engine room go out during a blackout, followed by the onset of the emergency generator that comes on within (e.g.) 45 seconds. Once the emergency generator is on, essential lights come on, which are fewer than all lights. That sequence of events, consisting of all-lights on, complete darkness, emergency lights on, and then (optionally) back to all lights on, is what is detected and reported as a blackout event by the system and method.

Figure 6:
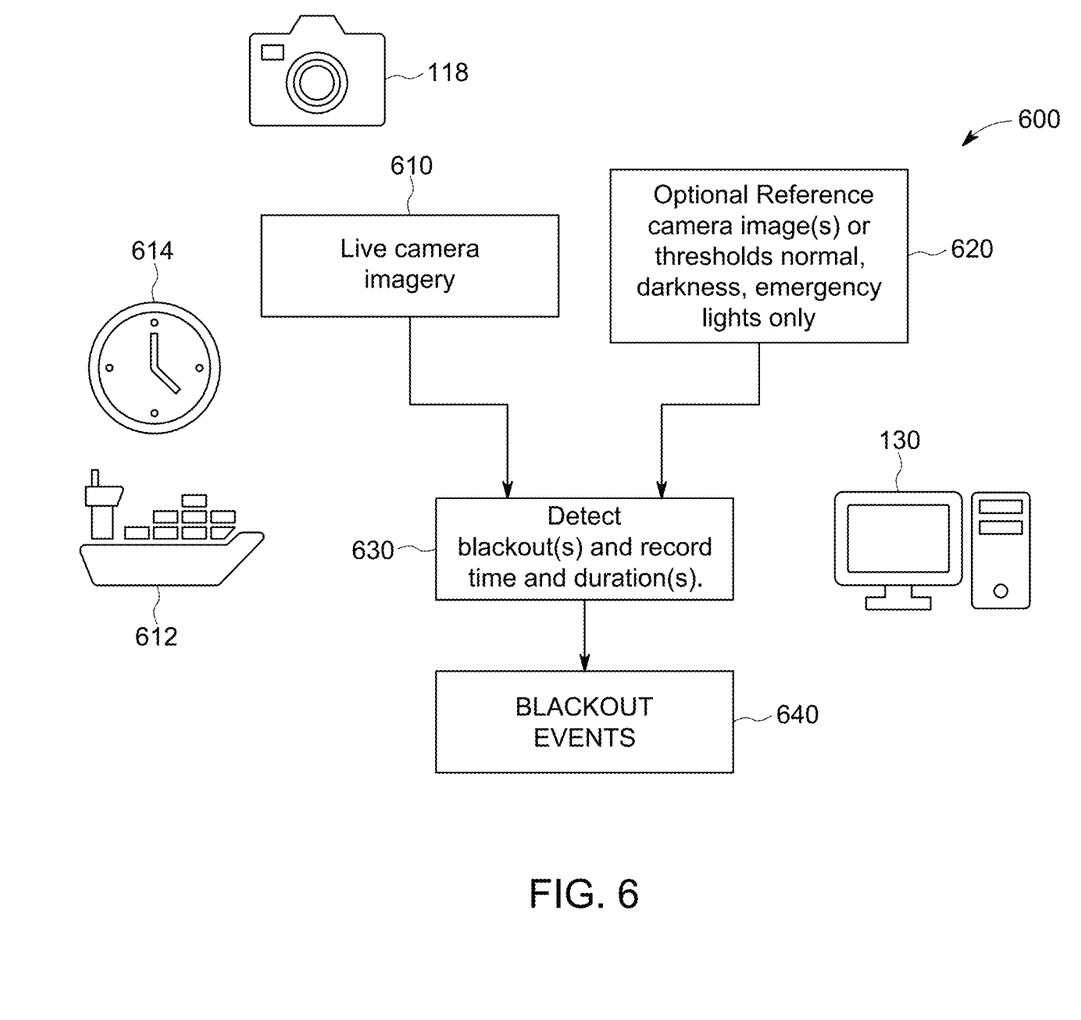
FIG. 6 is a flow diagram showing a generalized procedure for detecting blackout conditions based upon live acquired image(s) of an area of the vessel and reference image(s) and/or thresholds of the area acquired at similar times and/r under similar lighting conditions.

Reference is made to FIG. 6, which shows a generalized procedure 600 for detection of a blackout condition in an area of the vessel using the systems and methods for event detection and reporting contemplated herein. At a basic level, the camera(s) 118 acquire images of the area of the vessel 612 on an ongoing, periodic basis (step 610), which are stored and can be sampled for changes in normal lighting for the given time period 614. Images can be acquired at a high frame rate—for example 30 frames per second, but stored and/or sampled at a lower rate—for example every few seconds so that the server 130 is not overworked. A series of stored reference/sample images are provided (step 620), and/or various thresholds for normal conditions, darkness and emergency lighting can be provided (e.g. using histograms, etc., described below). These reference images/thresholds are delivered to the server 130 in step 630 to detect and categorize blackout events 640 and ascribe a time of occurrence/duration to them. The events 640 are then stored, and can be provided at an appropriate time over the transmission link to the shore-based server 140 for further analysis as part of the vessel and fleet performance profile, in a manner similar to other events. Notably, because the visual detection system is connected to an uninterruptible power supply, it maintains operation of the detection system during the blackout condition.

As noted above, the time and duration of the blackout event are recorded, stored in a database aboard the ship, uploaded to a database on the shore or in the cloud, and reported on dashboards both on the shore and on the ship.

The number and distribution of blackouts over time is also stored and reported as analytics and is compared with the number and distribution of blackouts of best performing ships. The number and distribution of blackouts over time is also aggregated over the fleet and reported and compared with best performing fleets.

Figure 7:
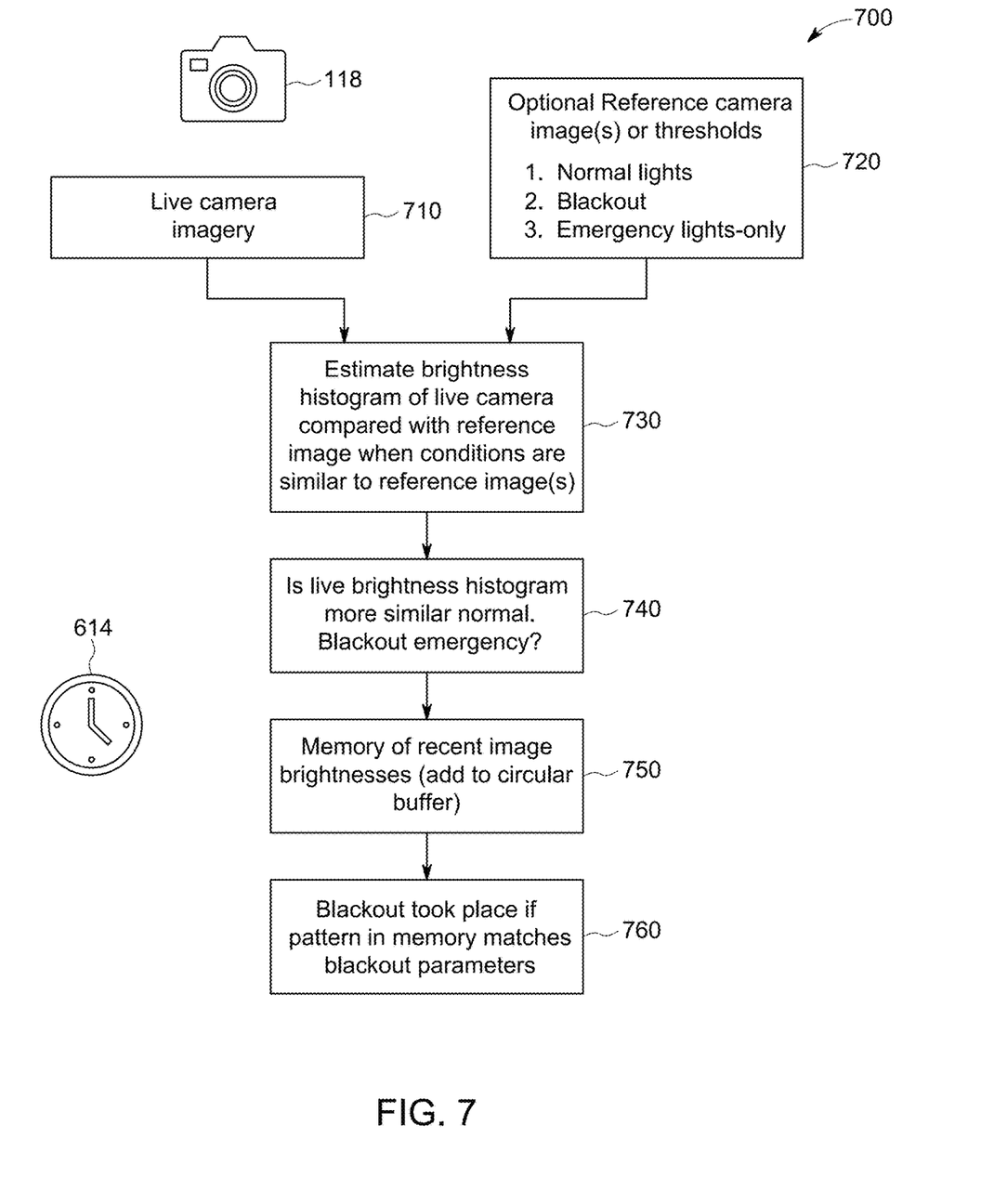
FIG. 7 is a more detailed procedure for detecting, determining and storing blackout (and related) events based upon the procedure of FIG. 6.

With reference now to FIG. 7, an exemplary procedure 700 for performing blackout detection in accordance with step 630 of FIG. 6 is shown in further detail. By way of non-limiting example, the acquired live camera image(s) 710 are combined with optional reference camera image(s) and/or threshold data 720 to estimate a brightness histogram of the live image(s) compared to a corresponding histogram (or other associated data form) for the reference image(s) and/or thresholds when the same time/conditions exist for the imaged area of the vessel (step 730). The procedure 700 then determines if the live brightness histogram is more similar to a histogram of a reference normal, reference blackout or reference emergency lighting histogram/image data (step 740). The similarity comparison could be checking a single threshold against the mean value of a single or aggregated histogram or comparisons of families of histograms or statistics of histograms or aggregated histograms. The comparison could also use methods associated with machine learning or deep learning and use multiple input images or histograms or statistics. The decision is flagged with an identification of the condition (normal/blackout/emergency) and a timestamp, and the image data and decisions are added to a circular buffer of sufficient size in server storage (step 750). Then, an analysis process, which can be part of the underlying event determination process searches the buffer for patterns of data that match a sequence of normal/blackout/emergency/(and optionally) restoration of normal) to determine if a blackout event has actually occurred and should be stored as such with associated images (step 760). Such an event is then moved into long-term storage and eventually transmitted to the on-shore server 140 via the wireless link 160, 162 for analysis as part of vessel and fleet performance data. Note that additional subordinate information can be provided with respect to blackout events for analysis and display to a user, such as vessel location, time of day, vessel speed, weather conditions, and/or vessel navigation status. These can assist users by providing further context for a blackout and/or pattern of blackouts (among other uses).

Note further that the land-based server 140 and its analytics platform/process 142 can perform blackout detection analytics that aggregates results over time by an individual vessel and by a fleet of vessels. The analytics platform can also compare the results with benchmarks and reports thereon via the user interface computer(s) 170 and associated display 172. The analytics platform can also produce a digital log file of all blackout events, including location, speed, weather condition, and other operational and/or navigation status information.

Additionally, that the comparison of acquired current/live image(s) to reference image(s) as described above can be accomplished using any acceptable computer-based software technique or a combination of techniques—for example, traditional image analysis tools, such as those available from Cognex Corporation of Natick, MA can be employed and/or deep learning tools can be used to make a comparison between live and trained images. Training of images for reference can be undertaken using synthesized images with expected lighting conditions, or by acquiring training images in each of a variety of expected normal, blackout and emergency lighting states at a plurality of times during the day.

As described above, the event data can be used by management and safety personnel to review ship performance and prophylactically identify/diagnose potential functional problems and/or maintenance issues before a major disaster occurs. Additionally, this particular event data can be used as another factor in determining overall risk for insurance and other risk-mitigation purposes in accordance with the above-incorporated U.S. patent application Ser. No. 17/973,675.

V. Conclusion

It should be clear that the above-described system and method for detection, determining, storing and analyzing visual blackout events of a seagoing commercial (e.g. cargo) vessel provides an effective and robust tool that leverages existing capabilities of event detection previously described. This additional functionality can be implemented with minimal new hardware—for example some commercially available UPS devices, and affords users increased information related to vessel/fleet safety and risk. More generally, it provides maintenance and fleet management personnel with valuable data on potential problems and more direction on those problem's root cause.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software-based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for automatically detecting a blackout condition in a commercial maritime vessel with at least one camera mounted in an area containing lighting on a maritime vessel as part of an automated visual event detection system comprising:
    at least one processor adapted to receive image data over a local network from the at least one camera and generate visual event information relative to the data;
    a communication link that transmits the visual event information from the processor to a land-based remote computer system that stores, analyzes and displays the visual event information;
    a data store associated with the processor that receives image data from the camera of an imaged scene on the maritime vessel, the data store providing live images of the scene and storing reference images of the scene associated with a plurality of conditions;
    an uninterruptible power supply interconnected to each of the at least one camera, the local network, the processor and the data store; and
    a blackout determination process that periodically compares one or more of a set of the reference images that defines blackout conditions of the area to a set of the conditions in two or more acquired current images of the area by the at least one camera, and determines therefrom whether the blackout conditions are present based upon the two or more acquired current images.

2. The system as set forth in claim 1, further comprising a communication link to communicate the visual event information defining a reduced bandwidth, wherein the information is transmitted in an order based on a hierarchy of the visual event information based upon significance thereof.

3. The system as set forth in claim 1, further comprising a storage arrangement that stores the visual event information, including a time and a duration of the blackout conditions in a land-based database on shore or in a cloud data storage.

4. The system as set forth in claim 1, wherein the visual event information includes subordinate information, including at least one of vessel location, vessel speed, weather conditions, and vessel navigation status.

5. The system as set forth in claim 1, wherein the blackout determination process derives a brightness histogram, respectively, for each of the one or more current image(s) and compares it to brightness or a brightness histogram for each of the reference image(s).

6. The system as set forth in claim 1, wherein the reference image(s) comprise images of lighting conditions in the area under each of normal lighting, blackout, and emergency lighting conditions in the area at one or more times of day.

7. The system as set forth in claim 6, wherein the land-based remote computer system performs blackout detection analytics aggregating results over time by an individual vessel and by a fleet of vessels.

8. The system as set forth in claim 7, wherein the analytics compares the results with benchmarks and reports thereon via a display.

9. The system as set forth in claim 8, wherein the analytics produces a digital log file of occurrences of blackout conditions, including vessel location, vessel speed, weather condition, and other operational and navigation status information.

10. The system as set forth in claim 1, wherein the blackout conditions include at least one each of a normal image, a blackout image, and an emergency image.

11. A method for automatically detecting a blackout condition in a commercial maritime vessel with at least one camera mounted in an area containing lighting on a maritime vessel as part of an automated visual event detection system, the method comprising the steps of:
    receiving image data over a local network from the at least one camera and generating visual event information relative to the data with a processor connected to the at least one camera;
    transmitting, over a communication link, the visual event information from the processor to a land-based remote computer system that stores, analyzes and displays the visual event information;
    storing, in a data store associated with the processor, image data received from the camera of an imaged scene on the maritime vessel, the data store having live images of the scene and storing reference images of the scene associated with a plurality of conditions;
    powering, with an uninterruptible power supply, each of the at least one camera, the local network, the processor and the data store during a blackout condition; and
    periodically comparing one or more of a set of the reference images that defines blackout conditions of the area to a set of the conditions in two or more acquired current images of the area by the at least one camera, and determining therefrom whether the blackout conditions are present based upon the two or more acquired current images.

12. The method as set forth in claim 11, further communicating the visual event information defining a reduced bandwidth, including, transmitting the information in an order based on a hierarchy of the visual event information based upon significance thereof.

13. The method as set forth in claim 11, further comprising, storing the visual event information, including a time and a duration of the blackout conditions in a land-based database on shore or in a cloud data storage.

14. The method as set forth in claim 11, further comprising, defining the visual event information to include subordinate information, including at least one of vessel location, vessel speed, weather conditions, and vessel navigation status.

15. The method as set forth in claim 11, wherein the step of determining includes deriving a brightness histogram, respectively, for each of the one or more current image(s), and comparing it to brightness or a brightness histogram for each of the reference image(s).

16. The method as set forth in claim 11, further comprising, defining the set of the reference images to include images of lighting conditions in the area under each of normal lighting, blackout, and emergency lighting conditions in the area at one or more times of day.

17. The method as set forth in claim 16, further comprising, performing blackout detection analytics aggregating results over time by an individual vessel and by a fleet of vessels.

18. The method as set forth in claim 17, further comprising, with the blackout detection analytics, comparing the results with benchmarks and reports thereon via a display.

19. The method as set forth in claim 18, further comprising, with the blackout analytics, producing a digital log file of occurrences of blackout conditions, including vessel location, vessel speed, weather condition, and other operational and navigation status information.

20. The method as set forth in claim 11, wherein the set of reference images comprises images of lighting conditions in the area under each of normal lighting, blackout, and emergency lighting in the area at one or more times of day.

\* \* \* \* \*